(12) United States Patent
Gassmann et al.

(10) Patent No.: US 7,698,960 B2
(45) Date of Patent: Apr. 20, 2010

(54) ASSEMBLY FOR DETERMINING TORQUE AT A FRICTION COUPLING

(75) Inventors: Theodor Gassmann, Siegburg (DE); Nikolaus Mayr, Reischach/Bruneck (IT); Mark Schmidt, Königswinter (DE); Ralph Mertens, Kaarst (DE); Kurt Müller, Merzenich (DE)

(73) Assignee: GKN Driveline International GmbH, Lohmar (DE)

( * ) Notice: Subject to any disclaimer, the term of this patent is extended or adjusted under 35 U.S.C. 154(b) by 433 days.

(21) Appl. No.: 11/550,043

(22) Filed: Oct. 17, 2006

(65) Prior Publication Data

US 2007/0186690 A1    Aug. 16, 2007

(30) Foreign Application Priority Data

Oct. 26, 2005   (DE) .................. 10 2005 051 501

(51) Int. Cl.
*G01L 3/14* (2006.01)
(52) U.S. Cl. ................................. 73/862.322
(58) Field of Classification Search ............. 73/862.322
See application file for complete search history.

(56) References Cited

U.S. PATENT DOCUMENTS

| | | | | |
|---|---|---|---|---|
| 3,597,986 A | * | 8/1971 | Bouthors et al. | ............. 474/25 |
| 4,903,804 A | * | 2/1990 | Beccaris et al. | .......... 192/56.31 |
| 4,987,790 A | * | 1/1991 | Weismann | .................... 74/333 |
| 5,423,235 A | | 6/1995 | Botterill et al. | |
| 5,657,629 A | * | 8/1997 | Folsom et al. | .................. 60/491 |
| 6,595,338 B2 | * | 7/2003 | Bansbach et al. | ......... 192/85 C |
| 6,766,889 B1 | * | 7/2004 | Pennycuff | ..................... 192/35 |
| 6,964,315 B2 | * | 11/2005 | Mueller | ...................... 180/247 |
| 7,216,751 B2 | * | 5/2007 | Teraoka | .................... 192/84.6 |
| 7,337,886 B2 | * | 3/2008 | Puiu | ....................... 192/70.23 |
| 2003/0188948 A1 | * | 10/2003 | Krzesicki | .................. 192/84.6 |
| 2006/0172845 A1 | | 8/2006 | Gassmann et al. | |
| 2006/0172846 A1 | | 8/2006 | Gassmann et al. | |

FOREIGN PATENT DOCUMENTS

WO    WO 2005064209    7/2005

\* cited by examiner

*Primary Examiner*—Lisa M Caputo
*Assistant Examiner*—Octavia Davis
(74) *Attorney, Agent, or Firm*—Rader, Fishman & Grauer PLLC

(57) ABSTRACT

An assembly for measuring force at a friction coupling, more particularly in the driveline of a motor vehicle. The assembly includes an outer plate carrier (6) at which outer plates (7) are held so as to be rotationally secured and in a way so as to be axially displaceable, wherein at least one of the outer plates (7) comprises an outer cam (12); an inner plate carrier (8) at which inner plates (9) are held in a rotationally fast way and in a way so as to be axially displaceable; wherein the outer plates (7) and the inner plates (9) are arranged so as to alternate in the axial direction, while jointly forming a plate package (10); a force measuring device arranged in such a way that, upon actuation of the friction coupling (3), it is loaded by the cam (12) in an operating direction extending at a distance from, and transversely to, the longitudinal axis (A).

18 Claims, 7 Drawing Sheets

ASSEMBLY FOR DETERMINING TORQUE AT A FRICTION COUPLING

TECHNICAL FIELD

The invention relates to an assembly for determining torque at a friction coupling, more particularly in the driveline of a motor vehicle.

BACKGROUND OF THE INVENTION

The friction coupling can be used in a differential assembly for variably distributing torque between two output shafts or as a hang-on coupling for an optionally drivable driving axle of a motor vehicle. A differential assembly featuring a variable torque distribution is known for example from U.S. Publication No. 2006/0172845, whereas U.S. Pat. No. 5,423,235 describes an example of a hang-on coupling.

Said friction couplings serve control purposes, more particularly they control the distribution of torque at two wheels of a driven axle or the distribution of torque between two drivable axles. To be able to carry out said control procedures, the coupling torque transmitted by the coupling has to be known and has to be continuously determined by suitable means. Because of changes in the friction coefficient of the friction lining which occur as a function of temperature and service life, determining the coupling moment via the pressure force of the friction plates is an inaccurate approximation of the actual coupling moment. In sophisticated lock and vectoring concepts with a variable torque distribution, inaccurate coupling moment estimates are inadequate and lead to complicated control methods or a limited use of the systems.

WO 2005/064209 A1 proposes a method of determining the coupling moment as well as a friction coupling with an electromechanical actuator. The actuator comprises a supporting disc axially fixed in a housing and a displaceable setting disc axially supported on the supporting disc. The supporting disc is provided in the form of an annular piston which is arranged in an annular chamber filled with a hydraulic fluid. For measuring the hydraulic pressure, a pressure sensing element is arranged in the annular chamber in the housing. The measured pressure is converted into an estimate of the transmitted coupling moment.

Accordingly, there exists a need for improved systems for accurately determining a torque at a friction coupling.

SUMMARY OF THE INVENTION

The present invention provides an assembly for determining torque at a friction coupling, more particularly for being used in the driveline of a motor vehicle, which assembly permits an accurate and direct determination of the torque occurring.

A first solution in accordance with the invention provides an assembly for measuring force at a friction coupling, more particularly in the driveline of a motor vehicle, comprising an outer plate carrier at which outer plates are held so as to be rotationally secured and in a way so as to be axially displaceable. At least one of the outer plates comprises an outer cam. The assembly includes an inner plate carrier at which inner plates are held in a rotationally fast way and in a way so as to be axially displaceable. The outer plates and the inner plates are arranged so as to alternate in the axial direction, while jointly forming a plate package. A force measuring sensor is arranged in such a way that, upon actuation of the friction coupling, it is loaded by the cam in an operating direction extending at a distance from, and transversely to, the longitudinal axis A.

The advantage of the above assembly is that by measuring the force directly at the friction coupling, it is possible to obtain accurate values as a basis for determining the coupling moment. Interfering factors such as a change in the friction coefficient of the coupling plates do not affect the measuring process. Thus, it is possible to provide accurate input values for the control system for controlling the driving dynamics of the motor vehicle. This, in turn, leads to improved control methods and, in the final analysis, to a greater driving stability of the motor vehicle. The system contemplates that at least one outer plate comprises a cam for loading the force sensor. This means that either one single or several outer plates can be supported at the force sensor. For example, it is possible for two of a total of four outer plates of a plate package to be designed for force measuring purposes, and it is particularly advantageous if the outer plates serving force measuring purposes are in friction contact on both sides with inner plates. In one embodiment, the at least one outer plate is arranged approximately axially centrally within the plate package. Errors associated with the measured results are thus reduced to a minimum. If existing, the remaining outer plates are not in contact with the measuring sensor and are held directly in the outer plate carrier in a rotationally fast way. In principle, the inventive assembly can be used in all friction couplings and wet brakes respectively in which the outer plates are received in a housing in a stationary condition. Such friction couplings can be found in automatic transmissions and, in connection with planetary drives, and in the above-mentioned systems for variably distributing driving torque.

According to a first embodiment, the at least one outer plate is supported in the outer plate carrier so as to be pivotable around a pivot axis being arranged at a distance from the cam and extending parallel to the longitudinal axis A. "Supported so as to be pivotable" is this context means that the at least one outer plate is pivotable relative to the outer plate carrier around the pivot axis B to a minimum extent, while, at the same time, being rotationally secured relative to the outer plate carrier by the two supporting points as formed, i.e. the force measuring sensor and the pivot bearing. Both the pivot axis B and the cam with its measuring point comprise a defined center offset relative to the longitudinal axis A which is taken into account when the coupling moment is determined from the measured force. The force can be measured both on only one supporting point or on both supporting points of the outer plate. Relative to the radial projection, the pivot axis is preferably arranged so as to be approximately diametrically opposite. According to another embodiment, the at least one outer plate comprises a bearing bore into which it is possible to insert a bearing pin providing pivotable support. The bearing bore can be provided in a radial projection of the at least one outer plate.

According to a second embodiment, the at least one outer plate is held so as to be rotatable to a limited extent relative to the outer plate carrier around the longitudinal axis A. "Rotatable to a limited extent" means that the at least one outer plate can be rotated until it abuts the force measuring sensor, so that the entire circumferential force is supported on the cam. For providing support, there are arranged preferably several supporting bearings around the circumference of the at least one outer plate. It is particularly advantageous to use two supporting bearings which, within an angular range of 180° around the longitudinal axis A—with reference to a main direction of rotation, i.e. during the forward operation of the motor vehicle—are positioned in front of the force measuring sensor and which are contacted by the at least one outer plate. As in the case of the above-mentioned embodiment, the force measurements take place via suitable measuring sensors which are loaded by the cam in an operating direction extending at a distance from and transversely to the longitudinal axis A. The supporting bearings can be provided in the form of rolling contact bearings and comprise a journal secured to the outer plate carrier, rolling members and an outer race at which there rests the at least one outer plate via a circumferential face.

According to a further embodiment, an actuator for actuating the friction coupling is provided. The actuator can be actuated either electro-mechanically or hydraulically. The actuator can be in the form of a ball ramp mechanism which comprises two discs which are rotatable relative to one another, which are arranged coaxially relative to one another which comprise pairs of ball grooves whose depth varies in the circumferential direction and which are provided for receiving balls, with one of the discs being axially supported and the other one of the disc being axially displaceable by a spring mechanism against returning forces, wherein the axially displaceable disc at least indirectly loads the plate package with an axial force. Using a ball ramp mechanism is advantageous in that it permits accurate control and independence of a hydraulic circuit.

According to a further embodiment, the force measuring sensor is provided in the form of a force sensor which operates transversely to and at a distance from the longitudinal axis. For measuring the force in one direction of rotation of the outer plates, the force sensor can be designed as a pressure sensor or tension sensor only or, for the purpose of measuring the force in both directions of rotation, it can be provided in the form of a combined tension/pressure sensor. The latter embodiment, upon actuation of the friction coupling, would permit the measuring of force both during forward driving and reversing, so that the driving dynamics of the motor vehicle could be controlled in both driving directions. Using a force sensor contemplates the possibility of using several circumferentially distributed force sensors. For example, using three force sensors would be advantageous for accurately centering the outer plates concerned, but it would be an expensive solution. The force measuring sensors are preferably arranged in the operating plane of the at least one outer plate in order to achieve the most accurate possible measurement results. When using only one single outer plate with a cam, the force measuring sensors would thus be arranged in the plate plane. If two outer plates with cams are used, the force measuring sensors would be arranged centrally in a plane positioned therebetween, etc.

A further solution provides a transmission assembly for variably distributing torque in the driveline of a motor vehicle, comprising a first shaft which is rotatably supported relative to a stationary housing around a longitudinal axis A; a second shaft which is coaxially arranged thereto and which is drivingly connected to the first shaft; a transmission stage arranged in the torque flow between the first shaft and the second shaft and having a first sun gear connected to the second shaft in a rotationally fast way, a second sun gear connected to the first shaft in a rotationally fast way, at least one planetary gear which engages the two sun gears and a web element which carries the at least one planetary gear and which is able to rotate around the longitudinal axis A; an assembly for measuring force at a friction coupling which serves to couple the web element to the housing, wherein the assembly is designed in accordance with the above-mentioned embodiments. By coupling the web element to the housing, torque is transmitted from one of the two shafts to the other one.

This solution offers the same advantages as the above-mentioned solution, i.e. very accurate measurements as a basis for controlling the driving dynamics of the motor vehicle by a variable driving torque distribution. In a respective embodiment, the inner plate carrier of the friction coupling is produced so as to be integral with the web element of the planetary drive. Furthermore, the outer plate carrier of the friction coupling can be produced so as to be integral with the housing of the transmission assembly.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION OF THE DRAWINGS

Figure 1:
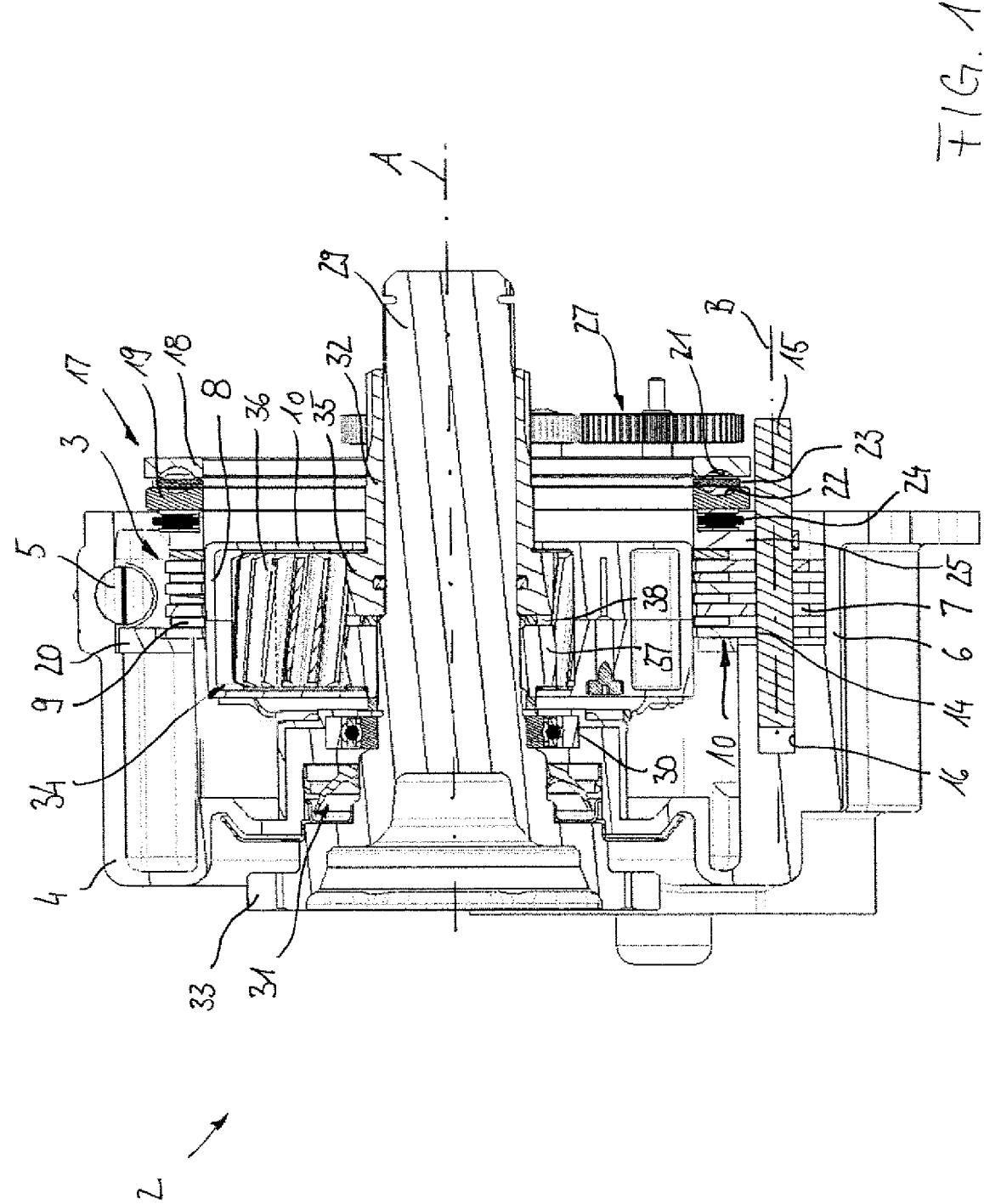
FIG. 1 is an inventive transmission assembly having an inventive assembly for measuring force at a friction coupling in a first embodiment in a longitudinal section.
Figure 2:
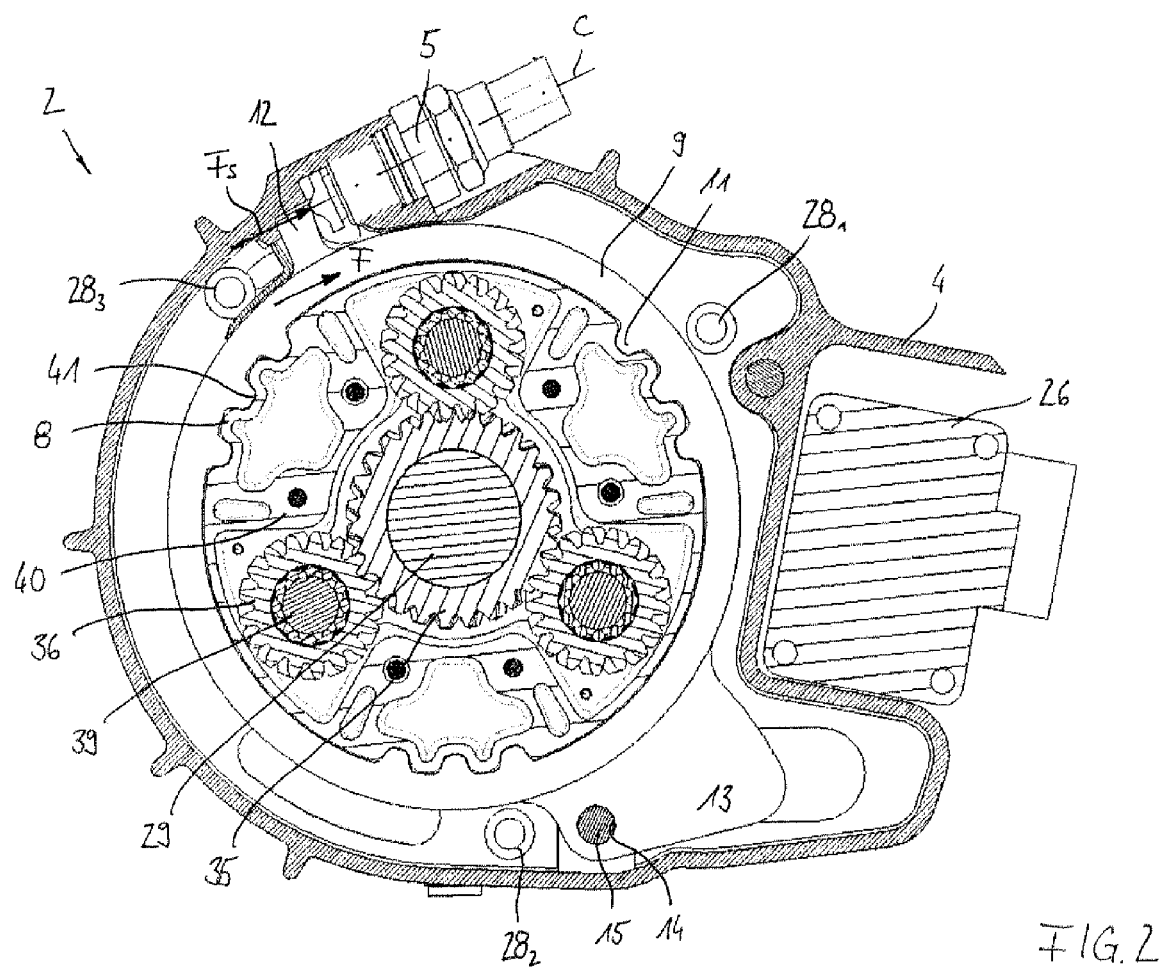
FIG. 2 shows the transmission assembly according to FIG. 1 in a cross-sectional view through a plane including the force measuring sensor.
Figure 3:
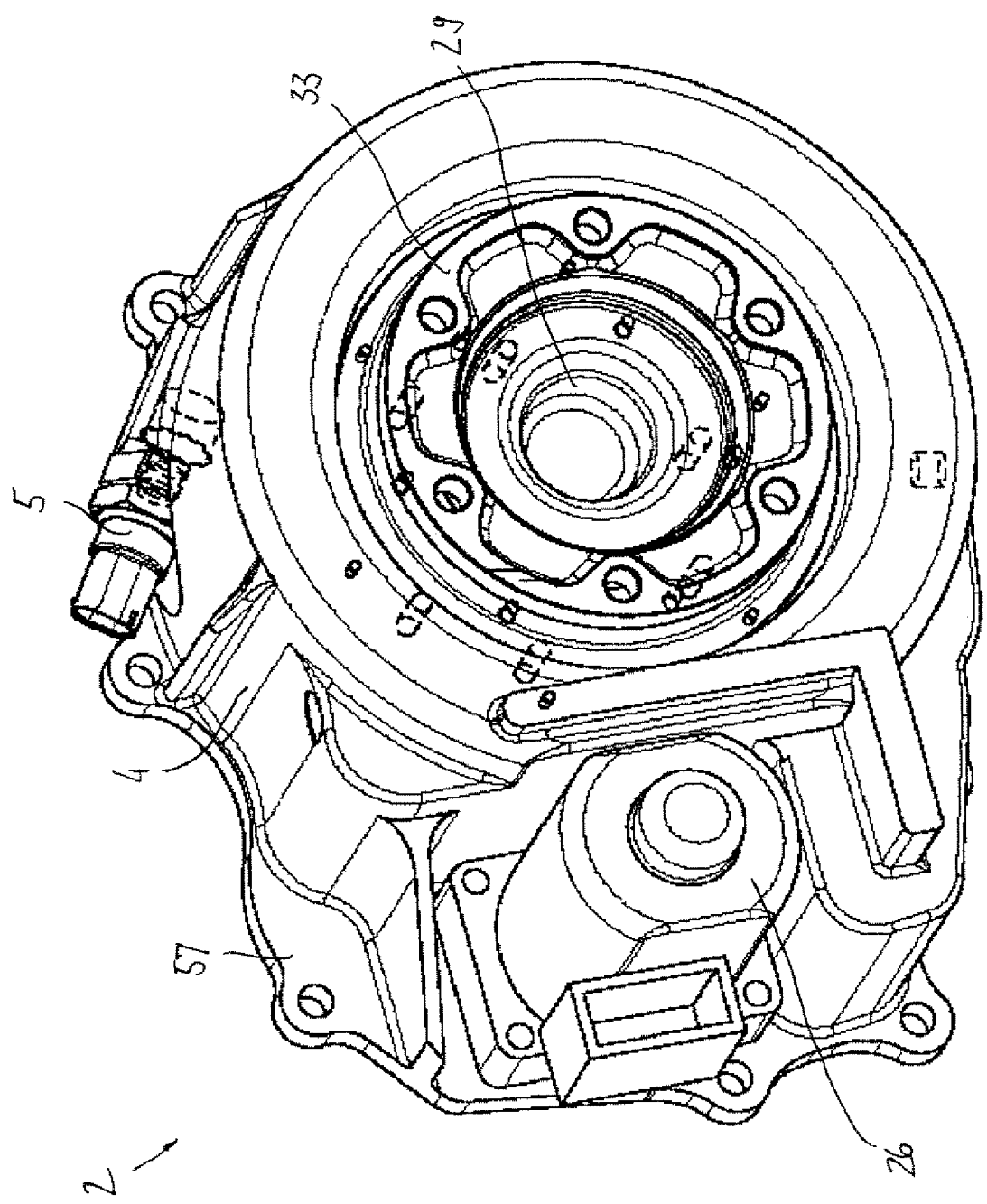
FIG. 3 shows the transmission assembly according to FIG. 1 in a perspective view.

FIGS. 1 to 3 will be described jointly below. They show an inventive transmission assembly 2 with an inventive assembly for measuring force at a friction coupling 3. The transmission assembly 2 is part of a differential drive which is described in connection with FIG. 9 and which serves to be used in the driveline of a motor vehicle.

The assembly for measuring force is received in a housing 4 and, in addition to the friction coupling 3, comprises force measuring device 5 provided in the form of a force sensor. The friction coupling 3 comprises an outer plate carrier 6 in which outer plates 7 are held so as to be rotationally fixed and axially displaceable along a longitudinal axis A, as well as an inner plate carrier 8 at which inner plates 9 are held so as to be rotationally fixed and axially displaceable along the longitudinal axis A. The outer plates 7 and the inner plates 9 are arranged so as to alternate axially and jointly form a plate package 10. The outer plate carrier 6 is provided in the stationary housing 4 and integrally produced therewith, whereas the inner plate carrier 8 is produced so as to be integral with a web element 40 which is rotatably supported on the longitudinal axis A. By actuating the friction coupling 3, the rotating inner plate carrier 8 is braked relative to the housing 4.

Figure 4:
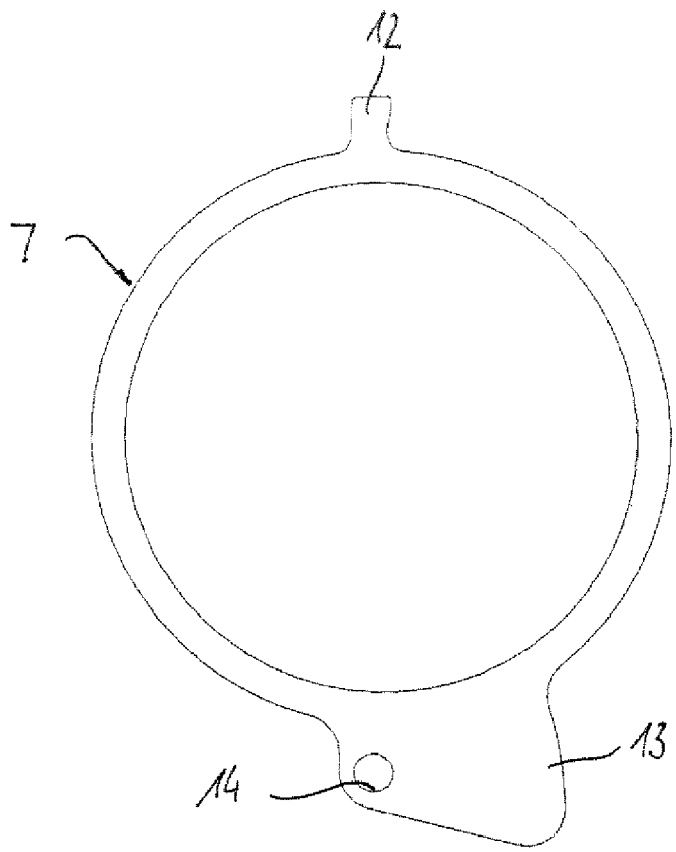
FIG. 4 shows an outer plate according to FIG. 1 in the form of a detail in a plan view.
Figure 5:
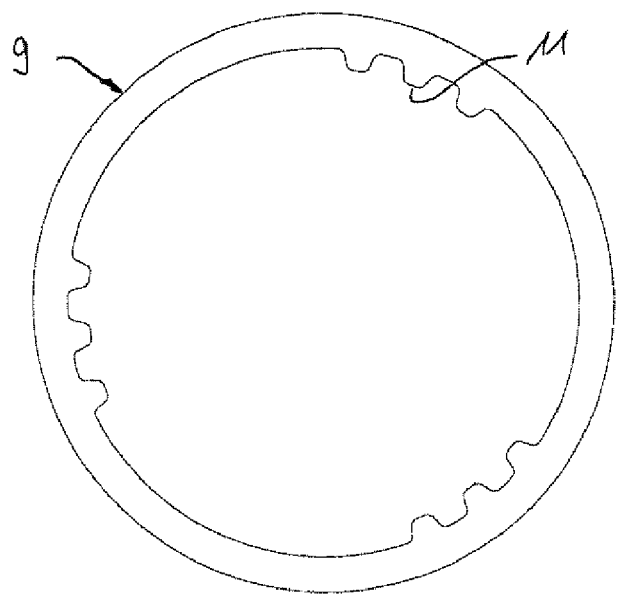
FIG. 5 shows an inner plate according to FIG. 1 in a plan view.

As is particularly evident in FIGS. 2 and 4, some of the outer plates 7 each comprise a cam 12 which is operationally connected to the force sensor 5. The force sensor 5 is arranged approximately axially centrally with reference to the plate package 10. In the present embodiment, the plate package 10 comprises four outer plates 7 and four inner plates 9, with the two central ones of the four outer plates 7 comprising cams 12 which load the force sensor 5. The two axially outermost outer plates 7 are not in contact with the force sensor, but are held directly in the outer plate carrier 6 so as to be rotationally fixed. As shown in FIG. 4, the outer plates 7 each comprise a radial projection 13 with a bearing bore 14 which is positioned diametrically opposite the outer cam 12 and also serves as a cooling rib. By way of their bearing bores 14, the outer plates 7 are pivotably supported on a bearing pin 15 which is positioned in a bore 16 in the housing 4. The bearing pin 15 defines the pivot axis B which extends parallel to the longitudinal axis A. The force sensor 5 and the pivot bearing 15 against which the outer plates 7 are circumferentially supported with an axial offset form two supporting points so that the outer plates are rotationally fixed relative to the housing 4. As shown in FIG. 5, the inner plates 9, at their inner circumferential face, comprise several circumferentially distributed toothed portions 11 by which they engage in a rotationally fast way corresponding counter teeth of the inner plate carrier 8.

Figure 6:
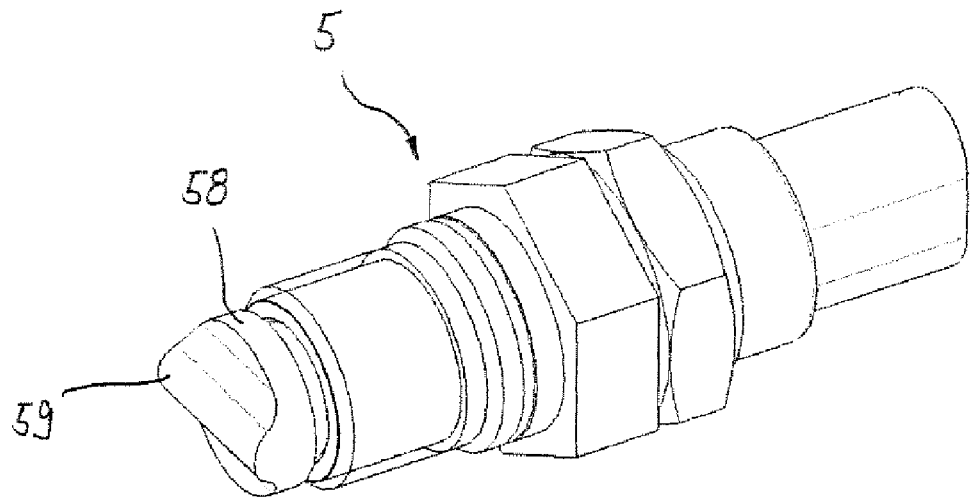
FIG. 6 shows the force sensor according to FIG. 1 in the form of a detail in a perspective view.

The force sensor 5 is held in the housing 4 in such a way that, as a result of the actuation of the friction coupling 3, it is loaded via the cam 12 by a force Fs in an operating direction extending at a distance from and transversely to the longitudinal axis A. The force sensor 5 is provided in the form of a pressure sensor which records the pressure force Fs applied by the cam 12 in the operating direction C when the friction coupling is actuated. For this purpose, the force sensor 5 illustrated in FIG. 6 in the form of a detail comprises a sensor head 58 with a raised portion 59 which extends parallel to the longitudinal axis A and which is loaded by the cams 12 of the two central outer plates 7. The convex raised portion, independently of the angular position of the force sensor 5, serves to achieve a clear or direct contact point or a direct contact line between the sensor head 58 and the cams 12 contacting same. A solution comprising a planar sensor head and a cam whose surface is curved so as to be convex in the direction towards the force sensor is also possible. The operating direction C of the force sensor 5 extends approximately in the circumferential direction or tangentially relative to the respective outer plates 7. The coupling moment is calculated on the basis of the forces measured by the force sensor 5 in a controller such as a computer unit (not illustrated). The pressure force Fs acting on the force sensor 5 and multiplied by the axial distance between the two supporting points corresponds to the coupling moment. The coupling moment equals the circumferential force F acting on the friction face and multiplied by the friction diameter of the outer plate 7. The coupling moment serves as the input parameter for a control system (not illustrated) for controlling the driving dynamics of the motor vehicle, which system controls the variable distribution of the driving moments on to the driving axles.

The friction coupling 3 is actuated by an actuator 17 in the form of a ball ramp mechanism. The ball ramp mechanism 17 comprises a supporting disc 18 which is held in a rotationally fast way in the housing, a setting disc 19 arranged coaxially relative thereto, as well as ball groove configurations with ball grooves 21, 22 with contra-directional pitches in the surfaces of the supporting disc 18 and of the setting disc 19, which surfaces face one another. Each two opposed, circumferentially extending ball grooves 21, 22 form a pair, each pair accommodating a ball. The balls are guided in a cage 23. The depth of the pair of ball groove varies around the circumference, so that a rotation of the setting disc 19 relative to the supporting disc 18 leads to an axial displacement. Via an axial bearing 24 and a pressure plate 25, the setting disc 19 loads the plate package 10, so that the multi-plate coupling 3 is actuated. The plate package 10 is axially supported in the housing 4 via an abutment plate 20. For rotating the setting disc 19, an electric motor 26 is provided which is secured to the housing 4 and, via a gear set 27, transmits torque to the setting disc 19. For this purpose, the setting disc is provided with a toothed segment (not shown) which is engaged by one of the gears. When the electric motor is switched off, the setting disc 19, via a circumferentially distributed spring mechanism 28, is pressed again towards the supporting disc 18 into the starting position. The electric motor 26 is controlled by the electronic control device which serves to control the driving dynamics of the motor vehicle.

The illustrated transmission assembly 2 comprises a first shaft 29 which is arranged coaxially relative to the friction coupling 3 and relative to the actuator 17 and which is rotatably supported by a rolling contact bearing 30 in the housing 4 and which is sealed by a seal 31 relative to the housing 4. The first shaft 29 comprises longitudinal teeth for being attached in a rotationally fast way to a sideshaft gear of a differential drive (not shown). A second shaft 32 is coaxially and rotatably supported on the first shaft 29 by a friction bearing. The second shaft 32 comprises longitudinal teeth for providing a rotationally fast connection with a differential carrier (not illustrated). At its outer end, the first shaft 29 comprises a flange 33 for providing a connection with an associated sideshaft of the motor vehicle (not illustrated). For torque transmitting purposes, the first and the second shaft 29, 32 are connected to one another by a transmission stage 34.

The transmission stage 34 comprises a first sun gear 35 which is integrally connected to the second shaft 32, a plurality of planetary gears 36 whose teeth engage those of the first sun gear 35, as well as a second sun gear 37 which engages the planetary gears 36 and which is connected in a rotationally fast way to the first shaft 29 via longitudinal teeth. The planetary gears 36 are each produced in one piece and comprise two toothed portions one of which engages the first sun gear 35 and the other one the second sun gear 37. The teeth are helical teeth in order to achieve an advantageous NVH (nose vibration harshness) behavior. The helical teeth are designed in such a way that the axial forces acting on the sun gears 35, 37 during the transmission of torque are directed towards each other. Between the two sun gears 35, 37, an axial bearing 38 is provided for supporting purposes. In order to achieve a speed ratio between the first shaft 29 and the second shaft 32, the two sun gears 35, 37 have different numbers of teeth, with the numbers of teeth of the planetary gears 36 and of the sun gears 35, 37 having been selected in such a way that a speed difference of up to 20% is achieved between the first shaft 29 and the second shaft 32.

The planetary gears 36 are rotatably received on journals 39 in the web element 40 by needle bearings 42. The web element 40 is basket-shaped and largely closed towards the outside. It can be seen that the web element 40 is produced so as to be integral with the inner plate carrier 8 and, at its outer circumferential face, comprises an engaging mechanism 41 which, for torque transmitting purposes, is engaged by inner plates 9 of the friction coupling 3 by their toothed portions 11. The friction coupling 3 whose design has been explained above serves for coupling the web element 40 including the planetary gears 36 to the housing 3 in order to pick up an additional torque directly at the differential carrier and transmit same via the second shaft 32 and the transmission stage 34 to the first shaft 29. It can be seen in FIG. 4 that the housing 3 comprises a flange 42 for being attached to the differential drive described below.

Figure 8:
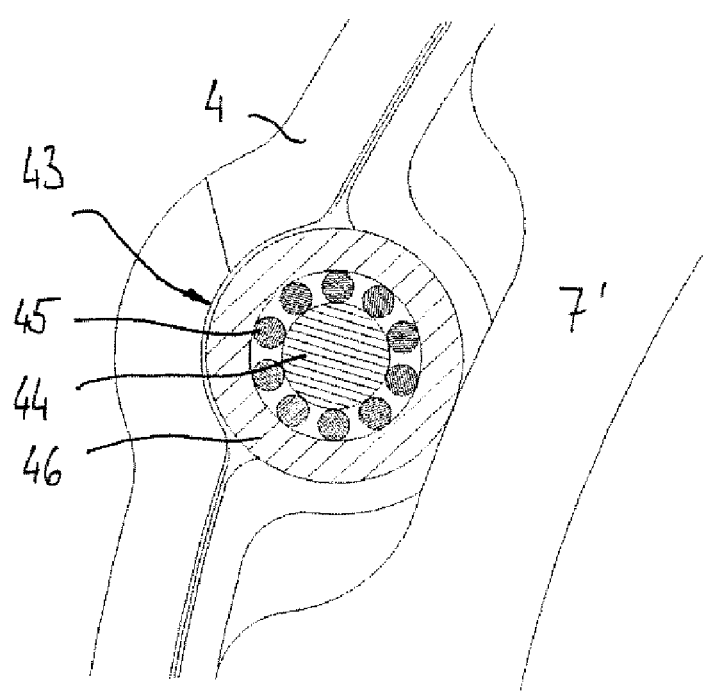
FIG. 8 shows one of the supporting bearings of FIG. 6 in the form of a detail.
Figure 7:
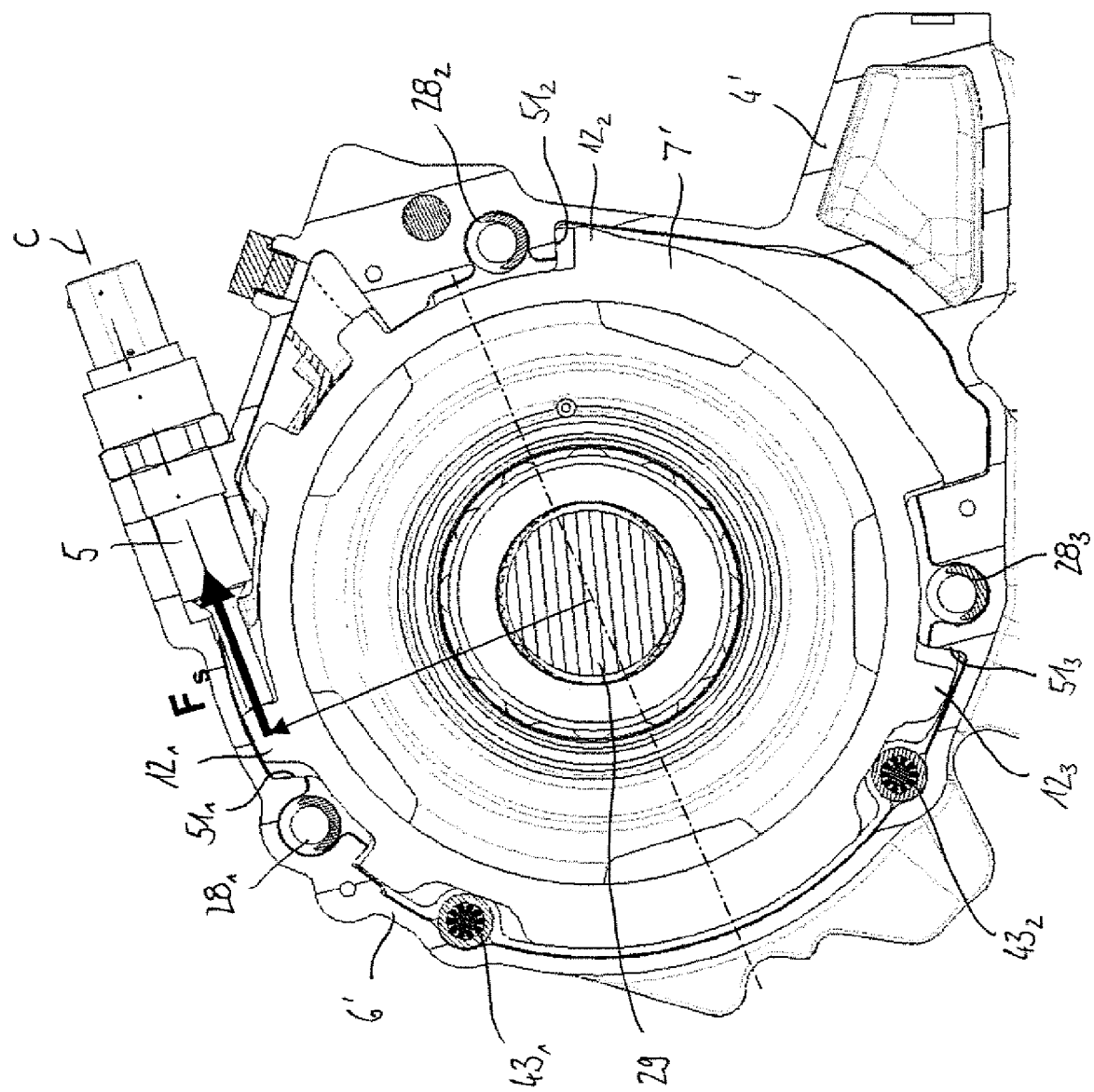
FIG. 7 shows an inventive transmission assembly with an inventive assembly for measuring force at a friction coupling in a second embodiment in a cross-sectional view.

FIGS. 7 and 8 show an inventive transmission assembly in an alternative embodiment. As far as design is concerned, it largely corresponds to the embodiment illustrated in FIGS. 1 to 6 to the description of which reference is made to that extent; identical components have been given the same reference numbers and the reference numbers of modified components have been provided with an apostrophe. The cross-section is such that an outer plate 7' is visible. In this embodiment, the outer plates 7' which serve to load the force sensor 5 are, to a limited extent, rotatably supported relative to the outer plate carrier 6' around the longitudinal axis A. For this purpose, there are provided two externally cylindrical supporting bearings 43 which rest against an outer circumferential face of the outer plates 7'. The force sensor 5 is also provided entirely in the form of a pressure sensor which is aligned tangentially and, respectively, circumferentially relative to the outer plates 7'. The two supporting bearings 43 are arranged within an angular range of 180° around the longitudinal axis A in front of the force sensor 5 in order to achieve advantageous supporting conditions for the outer plates 7' when the friction coupling 3 is actuated. As in the case of the above-mentioned embodiments, the force is measured via cams $12_1$ which, due to the friction coupling 3 being closed during forward driving of the motor vehicle, load the force sensor in an operating direction C extending at a distance from and transversely to the longitudinal axis A. During reversing, the outer plates 7' are able to rotate anti-clockwise relative to the outer plate carrier 6' to a limited extent until they abut via circumferentially distributed cams 12 against shoulders 51 in the outer plate carrier 6'. As shown in FIG. 8, the supporting bearings 43 are provided in the form of rolling contact bearings and each comprise a journal 44 secured in the housing 4, rolling contact members 45 in the form of needles and a sleeve-shaped outer race 46, which are in contact with the outer plates 7'. The cylindrical supporting bearings 43 extend parallel to the longitudinal axis A. The present embodiment functions in the same way as the above-mentioned embodiment, so that reference is made to the description of same.

Figure 9:
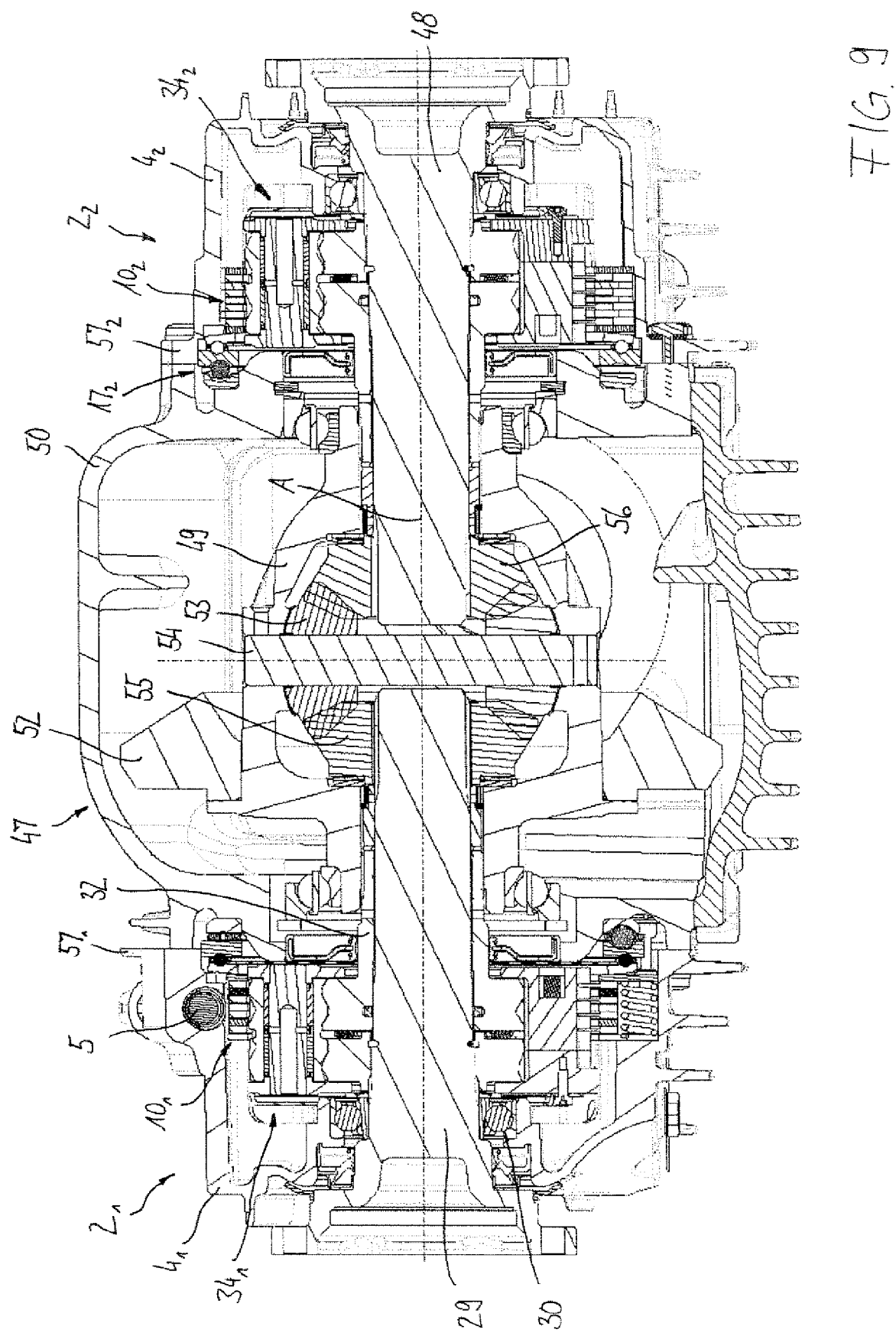
FIG. 9 shows a differential assembly with two inventive transmission assemblies in a longitudinal section.

FIG. 9 shows a differential drive 47 featuring a variable torque distribution for the driveline in a motor vehicle. The differential drive 47 is driven by a stepped drive (not illustrated) via a propshaft, and the incoming torque is distributed to two sideshafts 29, 48. The differential drive comprises a differential carrier 49 which is rotatably supported around the axis of rotation A in a stationary differential housing 50. In the differential carrier 49, a ring gear 52 is fixed which is driven by the driveshaft. In the differential carrier 49, a plurality of differential gears 53 are provided which are rotatably supported on journals 54 positioned perpendicularly relative to the axis of rotation A and which rotate with the differential carrier 49. Two sideshaft gears 55, 56 serving to transmit torque to the sideshafts 29, 48 engage the differential gears 53.

On the two sides of the differential housing 50, two transmission assemblies $2_1$, $2_2$ are provided which, in respect of design and functioning, largely correspond to the two above-described embodiments according to FIGS. 1 and 7. To that extent, reference is made to the description of same which applies to both transmission assemblies $2_1$, $2_2$. The transmission assemblies $2_1$, $2_2$, together with their housings $4_1$, $4_2$, are connected via flange connections $57_1$, $57_2$, to the differential housing 50. In the present embodiment, the force sensor of the righthand transmission assembly is positioned in a different sectional plane, so that it is not visible. It can be seen that the first shaft 29 of the lefthand transmission assembly forms the lefthand sideshaft and is connected in a rotationally fast way via a plug-in connection to the respective lefthand sideshaft gear 55 of the differential. The second shaft 32 of the lefthand transmission assembly provided in the form of a hollow shaft is connected in a rotationally fast way via a plug-in connection to the differential carrier 49. The righthand transmission assembly $2_2$ is connected analogously.

The inventive differential assemblies $2_1$, $2_2$ with the inventive force measuring assemblies at the friction coupling 3 allow the coupling moments to be determined accurately; they constitute an exact input parameter for the control system for controlling the driving dynamics of the motor vehicle. This leads to improved control procedures and, in the final analysis, to a greater driving stability.

While the invention has been described in connection with several embodiments, it should be understood that the invention is not limited to those embodiments. Thus, the invention covers all alternatives, modifications, and equivalents as may be included in the spirit and scope of the appended claims.

What is claimed is:

1. An assembly for measuring force comprising:
    a friction coupling including:
    an outer plate carrier at which outer plates are held so as to be rotationally secured and in a way so as to be axially displaceable, wherein at least one of the outer plates comprises an outer cam, said at least one outer plate defining a plane; and
    an inner plate carrier at which inner plates are held in a rotationally fast way and in a way so as to be axially displaceable;
    wherein the outer plates and the inner plates are arranged so as to alternate in the axial direction, while jointly forming a plate package; and
    a force measuring device which is positioned in said plane of said at least one outer plate in such a way that, upon actuation of the friction coupling, the force measuring device is loaded by the cam of said at least one outer plate in an operating direction extending at a distance from, and transversely to, a longitudinal axis (A).

2. An assembly according to claim 1, wherein the at least one outer plate is supported in the outer plate carrier so as to be pivotable around a pivot axis (B) extending parallel to the longitudinal axis (A).

3. An assembly according to claim 1, wherein the pivot axis (B) is arranged so as to be approximately diametrically opposite the cam.

4. An assembly according to claim 1, wherein the at least one outer plate comprises a bearing bore adapted to receive a bearing pin providing pivotable support.

5. An assembly according to claim 4, wherein the bearing bore is formed in a radial projection of the at least one outer plate.

6. An assembly according to claim 1, wherein the at least one outer plate is arranged axially between two inner plates.

7. An assembly according to claim 1, wherein the at least one outer plate is arranged approximately axially centrally in the plate package.

8. An assembly according to claim 1, comprising an actuator for actuating the friction coupling.

9. An assembly according to claim 8, wherein the actuator comprises a ball ramp mechanism which comprises two discs which are rotatable relative to one another, which are arranged coaxially relative to one another and which comprise pairs of ball grooves whose depth is variable in the circumferential direction and which are provided for accommodating balls, wherein one of the discs is axially supported and the other one of the discs is axially displaceable against the returning forces of a spring mechanism, wherein the axially displaceable disc at least indirectly loads the plate package with an axial force.

10. An assembly according to claim 1, wherein the force measuring device comprising a force sensor which operates transversely to, and at a distance from, the longitudinal axis (A).

11. An assembly according to claim 1, wherein the force measuring device is securely connected to the outer plate carrier.

12. An assembly according to claim 1 further comprising: a first shaft which is rotatably supported relative to a stationary housing around said longitudinal axis (A); a second shaft which is coaxially arranged thereto and which is drivingly connected to the first shaft; a transmission stage arranged in the torque flow between the first shaft and the second shaft and having a first sun gear connected to the second shaft in a rotationally fast way, a second sun gear connected to the first shaft in a rotationally fast way, at least one planetary gear which engages the two sun gears and a web element which carries the at least one planetary gear and which is able to rotate around the longitudinal axis (A); wherein said friction coupling couples said web element to said housing.

13. An assembly according to claim 12, wherein the inner plate carrier of the friction coupling is produced so as to be integral with the web element of the transmission stage.

14. An assembly according to claim 12, wherein the outer plate carrier of the friction coupling is produced so as to be integral with the housing of the transmission assembly.

15. An assembly for measuring force comprising:
a friction coupling including:
an outer plate carrier at which outer plates are held so as to be rotationally secured and in a way so as to be axially displaceable, wherein at least one of the outer plates comprises an outer cam, said at least one outer plate defining a plane; and
an inner plate carrier at which inner plates are held in a rotationally fast way and in a way so as to be axially displaceable;
wherein the outer plates and the inner plates are arranged so as to alternate in the axial direction, while jointly forming a plate package; and
a force measuring device which is positioned in said plane of said at least one outer plate in such a way that, upon actuation of the friction coupling, the force measuring device is loaded by the cam of said at least one outer plate in an operating direction extending at a distance from, and transversely to, a longitudinal axis (A), wherein the at least one outer plate is held so as to be rotatable to a limited extent relative to the outer plate carrier around the longitudinal axis (A).

16. An assembly according to claim 15, comprising a plurality of supporting bearings for supporting the at least one outer plate which are arranged so as to be circumferentially distributed.

17. An assembly according to claim 16, comprising two supporting bearings which are positioned within an angular range of 180.degree. around the longitudinal axis (A) in front of the force measuring device with reference to a primary direction of rotation, wherein the at least one outer plate rests against said two supporting bearings.

18. An assembly according to claim 16, wherein the supporting bearings are provided in the form of rolling contact bearings which each comprise a journal secured to the outer plate carrier, rolling contact members, and an outer race against which the at least one outer plate rests by way of a circumferential face.

* * * * *